UNITED STATES PATENT OFFICE.

JOKICHI TAKAMINE AND KEIZO WOOYENAKA, OF NEW YORK, N. Y.

ASEPTIC FRUIT-JUICE AND PROCESS OF MAKING THE SAME.

1,208,859.     Specification of Letters Patent.     Patented Dec. 19, 1916.

No Drawing.     Application filed October 13, 1913. Serial No. 794,803.

*To all whom it may concern:*

Be it known that we, JOKICHI TAKAMINE and KEIZO WOOYENAKA, subjects of the Emperor of Japan, residing in the city of New York and State of New York, have invented an Aseptic Fruit-Juice and the Process of Making the Same, of which the following is a specification.

Although we understand that our invention is applicable to various kinds of fruit juice, inclusive of the juice of grapes, apples, pears, peaches, apricots and lemons, nevertheless we have applied it particularly to orange juice, and therefore will refer to the juice of oranges, and particularly California and Florida oranges, in the description of our invention.

It is understood that nearly half of the oranges grown go to waste, and the need of some means of preserving orange juice has been felt for a very long time to prevent such waste.

Our invention is particularly designed to supply this need, and after much experimenting we are confident that it does so in a satisfactory and commercially feasible manner.

The sensitiveness of the orange is a serious obstacle in devising any means for its preservation because any heat requisite for rendering it aseptic destroys its flavor so as to render it unpalatable and useless for drinking purposes. On the other hand any antiseptic sufficient to prevent fermentation might be considered as rendering it obnoxious to the pure food laws.

We have discovered that by combining proper heat with proper antiseptic an aseptic juice may be produced which retains its desirable characteristics and avoids conflict with the pure food laws, and will keep indefinitely, or at any rate sufficiently for commercial purposes when protected from air. We have discovered that a proper temperature to enter into this combination is about between 122 and 132° F., and that a proper manner of applying this temperature is intermittently at such intervals as in conjunction with the antiseptic will stop any incipient fermentation, and finally attain a point where a permanently aseptic condition is reached.

We prefer to proceed as follows: To ordinary orange juice, such as is obtained from California or Florida oranges, we add sulfurous acid ($SO_2$) in the proportion of about one part by weight to fifty-five thousand (55,000) parts of juice, eighteen (18) milligrams per liter. We then place it in the bottle in which it is to be kept and sold, and cork it so as to exclude air. We then subject the bottle to a temperature below that at which the qualities of the juice are destroyed, which temperature we have found to be about between 122 and 132° F. We prefer to do this by immersing the bottle in water of said temperature. It is subjected to this temperature for about one hour. It is then removed and permitted to stand at the ordinary atmospheric temperature for a period of about two to three days, or until any potentiality toward fermentation may start. Thereupon the same degree of heat is again applied in the same manner for the same length of time, whereby any incipient fermentation is checked by the combined action of the moderate degree of heat with the moderate degree of antiseptic. Then it is again permitted to stand at ordinary atmospheric temperature for another period of about two or three days. Thereupon it is again subjected to heat of the same temperature, and for the same length of time.

In general the three heatings above referred to will be found sufficient to place the liquid in a permanently aseptic condition. Sometimes two heatings may be sufficient, and sometimes four heatings may be desirable.

After the final heating we prefer to prove the aseptic condition of the liquid by placing the bottle in an incubator at a temperature of about 95° F. for a period of about a week, during which if any potentiality toward fermentation remained it would show itself. It will of course in practice be sufficient to apply this proof to a few bottles of each batch undergoing treatment.

The permanently aseptic product of the foregoing process, may, according to our experience, be kept for an indefinite length of time, certainly sufficient for ordinary commercial and household purposes.

Testing the product of the above process for sulfurous acid by any well-known method, for instance that employing iodin, indicates that about half of the sulfurous acid added at the start to the juice is transformed into harmless compounds, or lost, therefore not only is the proportion of sulfurous acid added negligible from the standpoint of pure food, but also this portion is by the process itself reduced to substantially a mere trace.

Of course we do not deny that the juice thus sterilized will undergo a slight change both in flavor and taste such as takes place in wholesome oranges kept in cold storage. The change is possibly due to various enzyms present in oranges and is surely unavoidable. To destroy such enzyms is not the object of our present investigation, nor does their presence destroy the effectiveness of our process.

As the antiseptic we prefer sulfurous acid, but may suggest the following respectively as substitutes for the same: benzoic acid, salicylic acid, and salts of these acids, as well as salts of sulfurous acid.

In the claims we employ the term "acid antiseptic" to include the sulfurous acid, the other acids mentioned herein, and the salts thereof or derived therefrom.

Although we prefer that the heat be applied intermittently as above stated, nevertheless under certain circumstances and with certain juices we understand that the several instalments of heat may be combined and applied continuously.

We claim—

1. As a new article of manufacture, a beverage suitable for human consumption, consisting of an aseptic fruit juice containing an antiseptic in a quantity less than would be necessary to render the juice aseptic.

2. As an article of manufacture, a beverage suitable for human consumption consisting of aseptic orange juice containing an antiseptic in a quantity less than would be necessary to render the juice aseptic.

3. As an article of manufacture, a beverage suitable for human consumption consisting of aseptic orange juice containing sulfurous acid in less proportion than would be necessary to render the same aseptic.

4. As a new article of manufacture, aseptic citrous fruit juice having substantially its natural color and flavor, and containing a minute quantity of an antiseptic, and which will not ferment when subjected to a temperature of 95° F. for approximately one week.

5. As an article of manufacture, a citrous fruit juice which with air excluded, and subjected to the temperature of 95° F. for one week, will not ferment, and which contains an antiseptic in less proportion than is sufficient to render the whole aseptic.

6. The process of producing aseptic fruit juice which consists in the simultaneous treatment of the juice with an antiseptic and heat at a temperature below that necessary alone to render the juice aseptic.

7. The process of producing aseptic fruit juice, which consists in combining an acid antiseptic with the juice and heating the same to a temperature high enough in conjunction with the antiseptic to render the juice aseptic, but low enough not to materially affect the natural flavor of the juice.

8. The process of producing aseptic fruit juice, which consists in combining an acid antiseptic with the juice and heating the same to a temperature of from approximately 122° F. to 132° F.

9. The process of producing aseptic fruit juice, which consists in combining sulfurous acid with the juice and heating the same to a temperature high enough to render the juice aseptic and reduce the amount of antiseptic, but low enough not to materially destroy the natural flavor of the juice.

10. The process of producing aseptic fruit juice, which consists in combining sulfurous acid with the juice in the proportion of approximately one part of said acid to 55,000 parts of the juice and heating the same to a temperature of from approximately 122° F. to 132° F.

11. The process of producing aseptic fruit juice, which consists in combining an acid antiseptic with the juice and heating the same intermittently to a temperature high enough to render the juice aseptic, but low enough not to materially affect the natural flavor of the juice, said intermittent heatings being separated by periods of time sufficient to enable any potentiality toward fermentation which may be present to start.

12. The process of producing aseptic fruit juice, which consists in combining an acid antiseptic with the juice and heating the same intermittently to a temperature high enough to render the juice aseptic, but low enough not to materially affect the natural flavor of the juice, said intermittent heatings being conducted at intervals of from two to three days.

13. The process of producing aseptic fruit juice, which consists in combining an acid antiseptic with the juice and heating the same to a temperature high enough to render the juice aseptic, but low enough not to materially affect the natural flavor of the juice, and subjecting the juice to a temperature of substantially 95° F.

14. The process of producing aseptic citrous fruit juice which consists in subjecting the juice to the combined action of an antiseptic in quantity alone insufficient to render the juice aseptic, and to a temperature high enough, in conjunction with the antiseptic, to render the juice aseptic, but below a temperature sufficient alone to render the juice aseptic.

In testimony whereof we have hereunto signed our names in the presence of two subscribing witnesses.

JOKICHI TAKAMINE.
KEIZO WOOYENAKA.

Witnesses:
M. E. McNINCH,
C. G. HEYLMUR.